United States Patent
Huang et al.

(10) Patent No.: US 7,869,324 B2
(45) Date of Patent: Jan. 11, 2011

(54) METHOD FOR IDENTIFYING TYPE OF OPTICAL DISK

(75) Inventors: Jung-Huang Huang, Ma Tou Town, Tainan County (TW); Chia-Ming Chang, Chu Pei (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 295 days.

(21) Appl. No.: 12/140,567

(22) Filed: Jun. 17, 2008

(65) Prior Publication Data

US 2009/0225637 A1    Sep. 10, 2009

(30) Foreign Application Priority Data

Mar. 5, 2008    (TW) .............................. 97107596 A (51) Int. Cl.
  *G11B 7/00*    (2006.01)
(52) U.S. Cl. ................. 369/53.23; 369/53.2; 369/44.25; 369/44.34; 369/47.1
(58) Field of Classification Search ....................... None
  See application file for complete search history.

(56) References Cited

U.S. PATENT DOCUMENTS

| | | | |
|---|---|---|---|
| 6,778,479 B2 | 8/2004 | Weng | |
| 2005/0068873 A1* | 3/2005 | Chung | ..................... 369/53.23 |
| 2005/0265187 A1 | 12/2005 | Chang et al. | |
| 2005/0265188 A1 | 12/2005 | Chang et al. | |
| 2008/0151701 A1* | 6/2008 | Park et al. | ................. 369/13.53 |

* cited by examiner

*Primary Examiner*—Muhammad N Edun
(74) *Attorney, Agent, or Firm*—Muncy, Geissler, Olds & Lowe, PLLC (57) ABSTRACT

A method for identifying a type of an optical disk includes the steps of: turning on a laser diode of an optical pickup and focusing light emitted from the laser diode on the optical disk; moving the optical pickup to obtain a plurality of servo signals; reading a specific servo signal from the servo signals; and determining the type of the optical disk according to the count of enabled times of the specific servo signal and a corresponding enabled time period.

15 Claims, 9 Drawing Sheets

METHOD FOR IDENTIFYING TYPE OF OPTICAL DISK

This application claims priority of No. 097107596 filed in Taiwan R.O.C. on Mar. 5, 2008 under 35 USC 119, the entire content of which is hereby incorporated by reference.

BACKGROUND OF THE INVENTION

1. Field of Invention

The invention relates to the technology associated with an optical disk, and more particularly to a method for identifying a type of an optical disk.

2. Related Art

Recently, the technology grows rapidly, and optical disks, such as compact disks (CD) and a digital versatile disks (DVD), are getting more and more popular. Because the CD and DVD are designed for laser with different wavelengths and have different reflective indexes, the controller must download different parameters to access different types of disks. At this time, it is very important to correctly identify the type of the disk. This is because the ability of playing the disk will be deteriorated if the controller loads the wrong parameters. In addition, different types of optical disks have different written data formats, so the system must first identify the type of the disk to correctly load the parameters to read the disk or write the data into the disk.

The DVD may be categorized into various types including DVD-ROM, DVD+R/RW, DVD-R/RW and DVD-RAM. Each type may be classified into three states including a finalized state, an un-finalized state and an empty state.

In the conventional art, there are several methods for identifying the type of the DVD, and the methods will be described in the following.

The U.S. Patent Publication No. 2005/0265188 discloses a method for identifying the disk as the DVD-ROM, DVD+R or DVD-R according to the frequency of the wobble signal when the disk is read. In this method, a set of default parameters is set in a controller, then the frequency of the wobble signal on the DVD is obtained by reading, and then the type of the disk is identified according to the predetermined threshold value of the frequency. No wobble signal exists on a typical DVD-ROM disk, the frequency of the wobble signal on the DVD+R disk is 817.4 KHz, and the frequency of the wobble signal on the DVD-R disk is 140.6 KHz. Because the difference of the above frequency is obvious, this method can indeed identify the type of the disk.

However, this method has the drawback that the optical drive has to first track on and then read the frequency of the wobble signal. If the quality of the disk is too bad or data has been recorded on the disk, the wobble signal will have a lot of noise, which may interfere the precision of identifying the disk. In addition, before the frequency of the wobble signal is read, the optical drive has to work according to one set of default parameters, and the loaded parameters may not certainly suitable for any disks. If the quality of the disk is too bad, other sets of parameters will have to be tried to read the disk. Thus, the time period of reading the data on the disk is increased.

The U.S. Patent Publication No. 2005/0265187 discloses a method for identifying the disk as DVD+R or DVD-R according to the peak-to-peak voltage of the wobble signal on the disk. In this method, the default DVD-R parameters are first set in the controller, and then the wobble signal on the DVD is read. A threshold value is set to identify the type of the disk according to the level of the read wobble signal. Because a land pre pit (LPP) signal is pre-formed between grooves in the wobble signal of DVD-R, the level of the wobble signal is typically higher than that of DVD+R, and the disk is identified as DVD+R or DVD-R according to this concept. When the peak-to-peak voltage of the wobble signal is higher than a predetermined threshold value, the read optical disk is identified as DVD-R. When the peak-to-peak voltage of the wobble signal is lower than the predetermined threshold value, the read optical disk is identified as DVD+R.

Similarly, this method has the drawback that the optical drive has to first track on to read the wobble signal. In addition, the major problem is that the voltage level of the read wobble signal changes as the reflective index of the disk changes. In one specific condition, the DVD+R disk may have the higher reflective index so that the read level of the wobble signal is higher than the predetermined threshold value and the optical drive incorrectly identifies DVD+R as DVD-R. On the contrary, the DVD-R may be incorrectly identified as DVD+R. Thus, this method cannot be easily applied to the optical drive.

Taiwan Patent No. 1272580 (U.S. Pat. No. 6,778,479) discloses a method for identifying the type of the disk by reading the data storage format in the lead-in zone. This is because the basic information, including the type of the disk or the starting address and the ending address of the data in the disk, is stored in the lead-in zone of the disk. This method is to read the data in the lead-in zone on the optical disk after the optical drive is turned on, and thus to identify the type of the disk.

Similarly, this method has the drawback that the data in the lead-in zone cannot be read after the optical drive is turned on. Because the type of the disk is unknown, the optical drive has to read the data according to one default set of parameters. If the parameters loaded into the controller are not suitable for the disk in the optical drive, another set of parameters has to be re-loaded into the controller of the optical drive and the optical drive tries to read the data on the disk until the suitable parameters are loaded. Consequently, the time of reading the disk is inevitably increased. In addition, the disk type field in the lead-in zone of the DVD+R disk may be filled by the user. So, the user may fill this field with other types of disks in order to enhance the compatibility of this DVD+R. Thus, the optical drive may incorrectly identify the type of the disk.

SUMMARY OF THE INVENTION

The invention can identify six types of DVDs with different states, including DVD-ROM, finalized DVD±R/multi-section DVD±R, un-finalized DVD-R, un-finalized DVD+R, empty DVD-R, and empty DVD+R, respectively. That is, the invention can distinguish between the DVD-ROM and the DVD±R with various recorded states. The invention can quickly and correctly identify the type and the state of the disk according to the distribution of the voltage difference of the servo signal generated due to different recorded positions in the data zone of the DVD disks.

It is therefore an object of the invention to provide a method for identifying a type of an optical disk quickly and correctly according to different properties at the position of the recorded zone of the disk.

Another object of the invention is to provide a method for identifying various types of optical disk without waiting for the turn-on procedure.

To achieve the above-identified or other objects, the invention provides a method for identifying a type of an optical disk. The method includes the steps of: turning on a laser diode of an optical pickup and focusing light emitted from the laser diode on the optical disk; moving the optical pickup to acquire a plurality of servo signals; reading one of the specific servo signals; and determining the type of the optical disk according to the number of enabled times of the specific servo signal and a corresponding enabled time period.

In the method for identifying the type of the optical disk according to the preferred embodiment of the invention, the step of moving the optical pickup includes moving the optical pickup by a distance, for example, from the inner ring of the disk to the outer ring or from the outer ring of the disk to inner ring of the disk. In one embodiment, the step of reading one of the specific servo signals includes: saving the count of enabled times of the specific servo signal and the enabled time period at each time; and saving a ratio of the enabled time period to a total time period of moving the optical pickup. In one embodiment, the step of determining the type of the optical disk includes: identifying the optical disk as an empty DVD+R disk when the count of enabled times of the specific servo signal is 0; identifying the optical disk as an un-finalized DVD+R disk when the count of enabled times of the specific servo signal is 2; and identifying the disk as an un-finalized DVD-R disk when the count of enabled times of the specific servo signal is 3. In one embodiment, the step of identifying the type of the optical disk according to the count of enabled times of the specific servo signal and the corresponding enabled time period when the count of enabled times of the specific servo signal is 1 includes: calculating a ratio of a total time period of moving the optical pickup to an enabled time period of the specific servo signal; identifying the optical disk as an empty DVD-R disk when the ratio is smaller than a predetermined value; identifying the optical disk as a finalized DVD-R disk or DVD+R disk when the ratio is greater than the predetermined value and smaller than 1; and identifying the optical disk as a DVD-ROM disk when the ratio is equal to 1.

In the method for identifying the type of the optical disk according to the preferred embodiment of the invention, the specific servo signal may be a recorded detection (RECD) signal, a focus error (FE) signal, a tracking error (TE) signal, a radio frequency (RF) signal, a radio frequency ripple (RFRP) signal or a recorded sub beam add (SBAD) signal.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
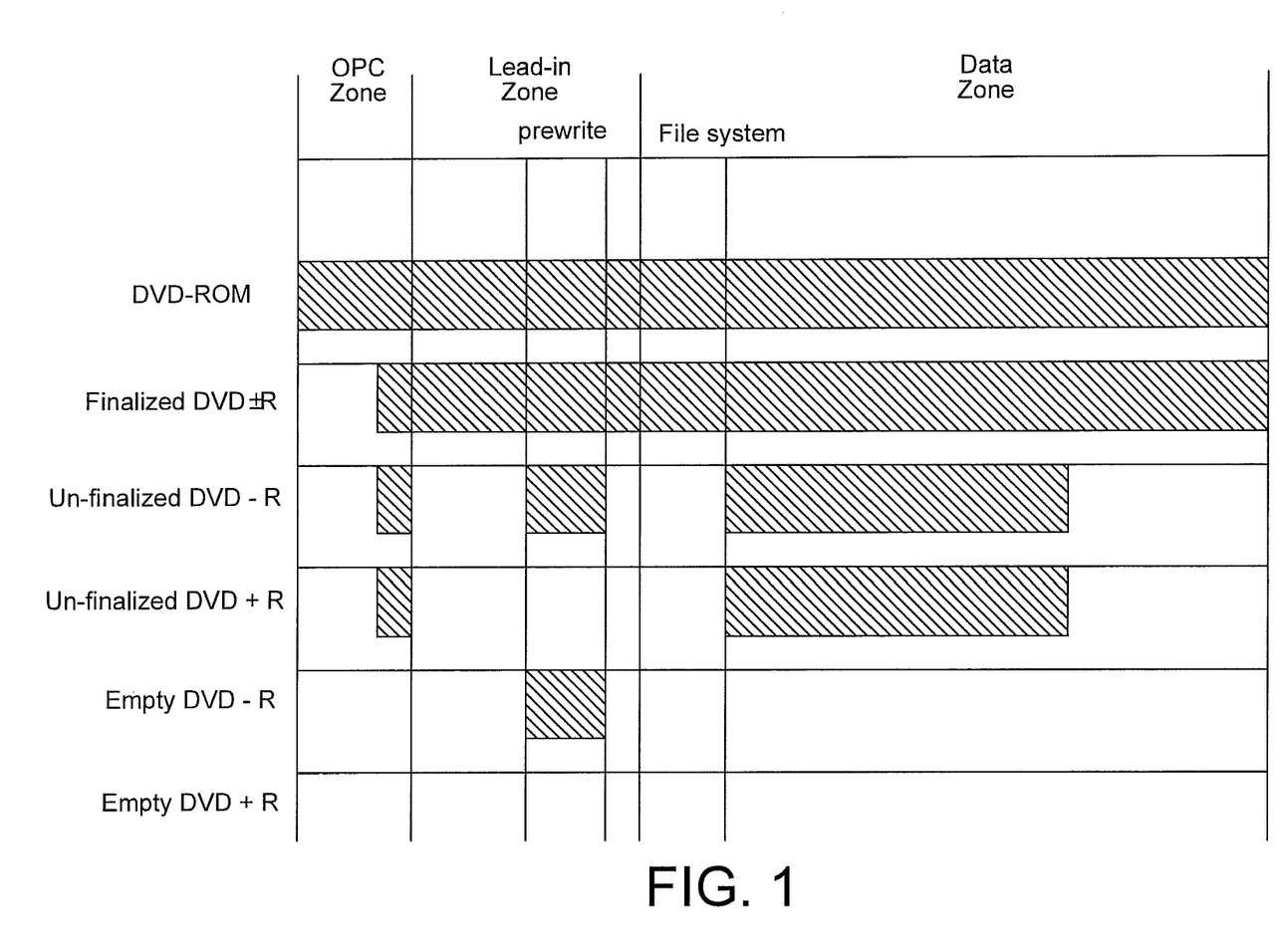
FIG. 1 is a data allocation chart showing data allocation of various optical disks according to the embodiment of the invention.

FIG. 1 is a data allocation chart showing data allocation of various optical disks according to the embodiment of the invention. In this embodiment of FIG. 1, the mainstream DVD disk will be illustrated as an example. This data allocation chart has shown, from top to bottom, a DVD-ROM disk, a finalized DVD+R disk or DVD-R disk, an un-finalized DVD-R disk, an un-finalized DVD+R disk, an empty DVD-R disk and an empty DVD+R disk.

One DVD disk may be compartmentalized into an optimal power calibration zone (OPC Zone), a lead-in zone and a data zone. When a recorder starts to write data on the disk, the recorder can perform a test writing procedure in the optimal power calibration zone, and then calibrate the laser power according to the written result to ensure the readability of the written data. The lead-in zone mainly includes physical format information of the disk, the manufacturing information of the disk and the information of the content provider. The data zone is used to store the data recorded by the user or the data in the disk.

As shown in FIG. 1, the DVD-ROM disk is completely recorded with data; the finalized DVD+R disk or DVD-R disk is recorded with data except for a portion of the optimal power calibration zone being kept empty; the un-finalized DVD-R disk is recorded with data in a portion of the optimal power calibration zone, a prewrite zone of the lead-in zone and the data zone; the un-finalized DVD+R disk is only recorded with data in the optimal power calibration zone and the data zone; the empty DVD-R disk is recorded with data in the prewrite zone of the lead-in zone; and the empty DVD+R disk has no written data. The prewrite zone is recorded with the type of the disk and the information of the manufacturer by the disk manufacturer when the disk is manufactured.

Figure 2:
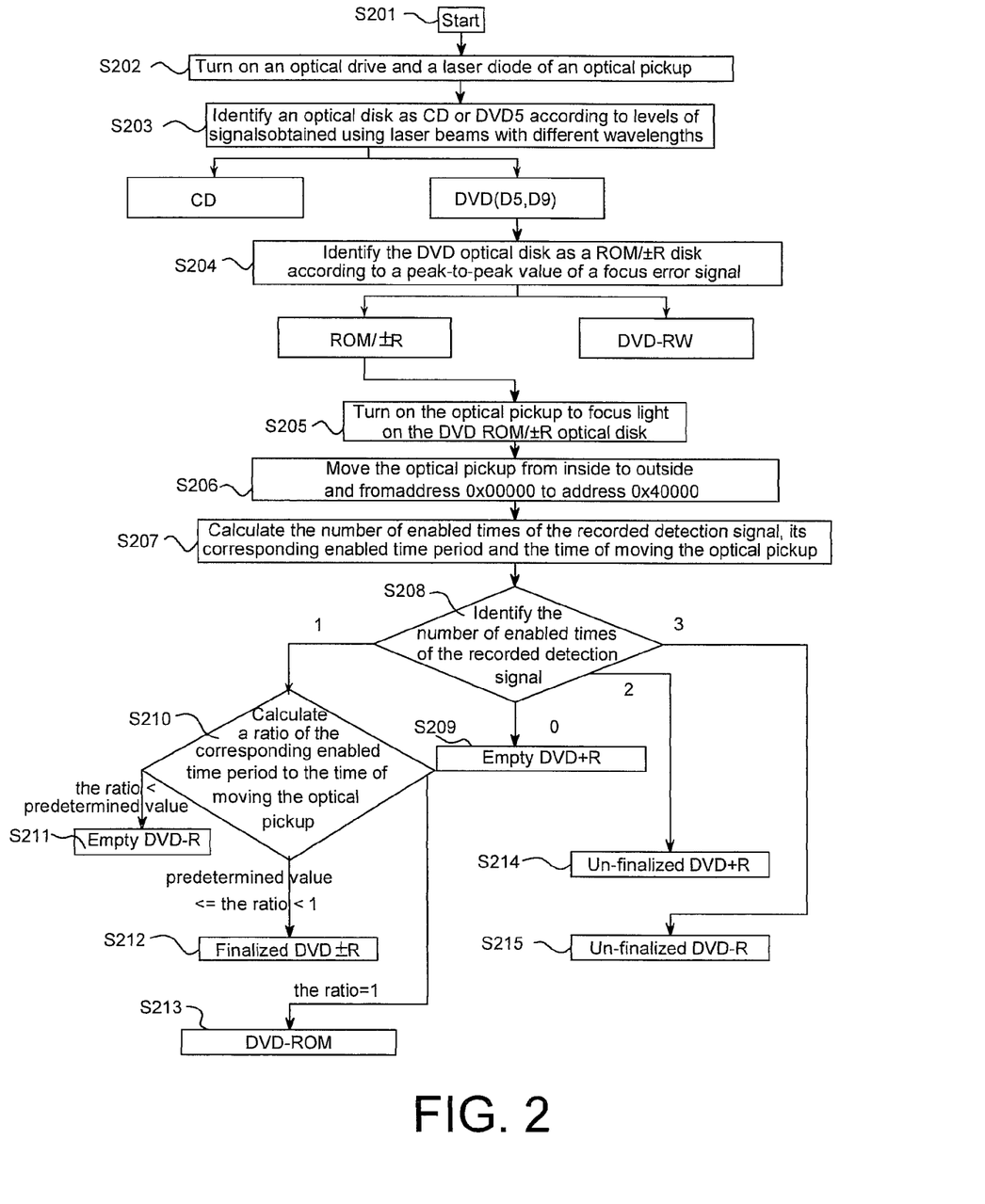
FIG. 2 is a flow chart showing a method for identifying a type of an optical disk according to the embodiment of the invention.

FIG. 2 is a flow chart showing a method for identifying a type of an optical disk according to the embodiment of the invention. Referring to FIG. 2, the method for identifying the type of the optical disk includes the following steps.

In step S201, the procedure starts.

In step S202, an optical drive is turned on and a laser diode of an optical pickup is turned on.

In step S203, the optical disk is identified as CD, DVD5 or DVD9 according to levels of the signals obtained using different laser beams with different wavelengths. There are many conventional methods for performing the step S203, so detailed descriptions of this step will be omitted. When the disk is identified as the DVD, step S204 is performed.

In the step S204, after the disk is identified as the DVD disk, the DVD optical disk may be identified as a ROM/±R disk or a RW disk according to a peak-to-peak value of a focus error signal. There are many conventional methods for performing the step S204, so detailed descriptions of this step will be omitted. When the disk is identified as not pertaining to the RW disk, step S205 is performed.

In the step S205, the optical pickup is turned on to focus light emitted therefrom on the DVD ROM/±R optical disk.

In step S206, the optical pickup is moved from an inner ring of the disk to an outer ring of the disk or from the outer ring of the disk to the inner ring of the disk (e.g., moved between the addresses 0x00000 and 0x40000). Because the optical pickup has to read the optimal power calibration zone, the lead-in zone and the data zone of the optical disk in order to identify the type of the disk, the addresses read and crossed by the optical pickup have to include at least the addresses 0x00000 to 0x40000 in order to read the optimal power calibration zone, the lead-in zone and the data zone.

Figure 3:
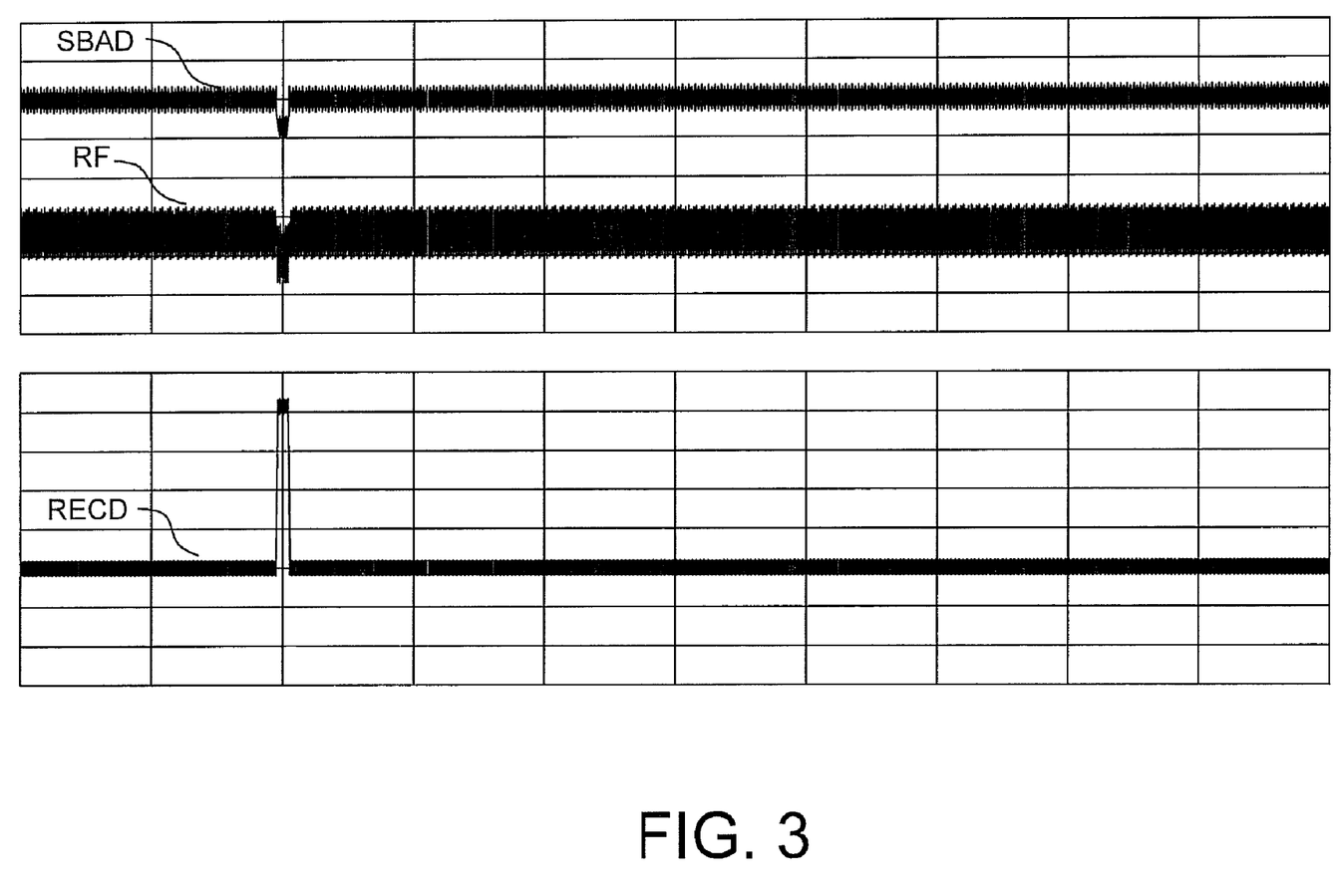
FIG. 3 shows waveforms of various servo signals obtained when step S206 is performed and the optical disk is an empty DVD-R.
Figure 4:
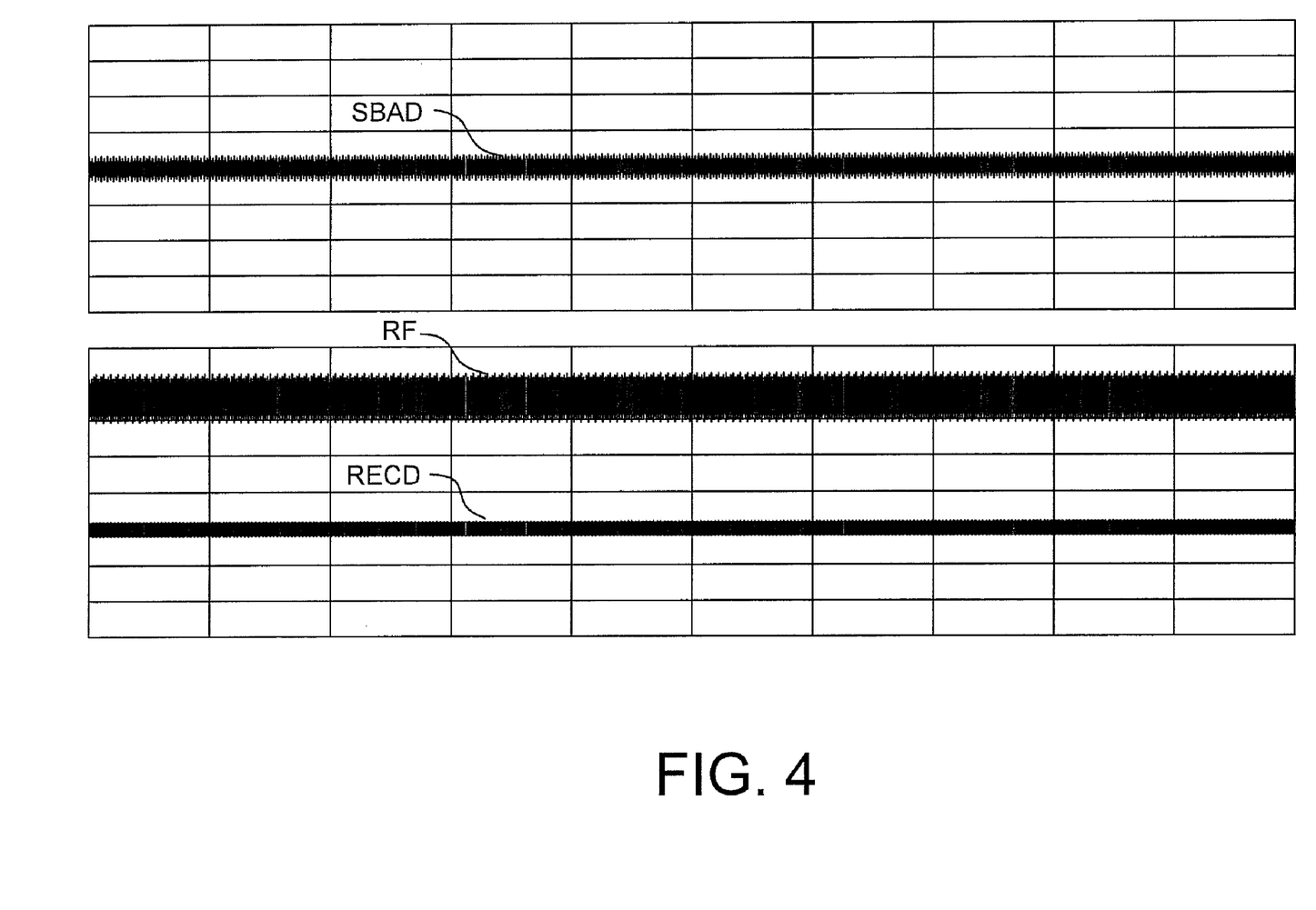
FIG. 4 shows waveforms of various servo signals obtained when the step S206 is performed and the optical disk is an empty DVD+R.
Figure 5:
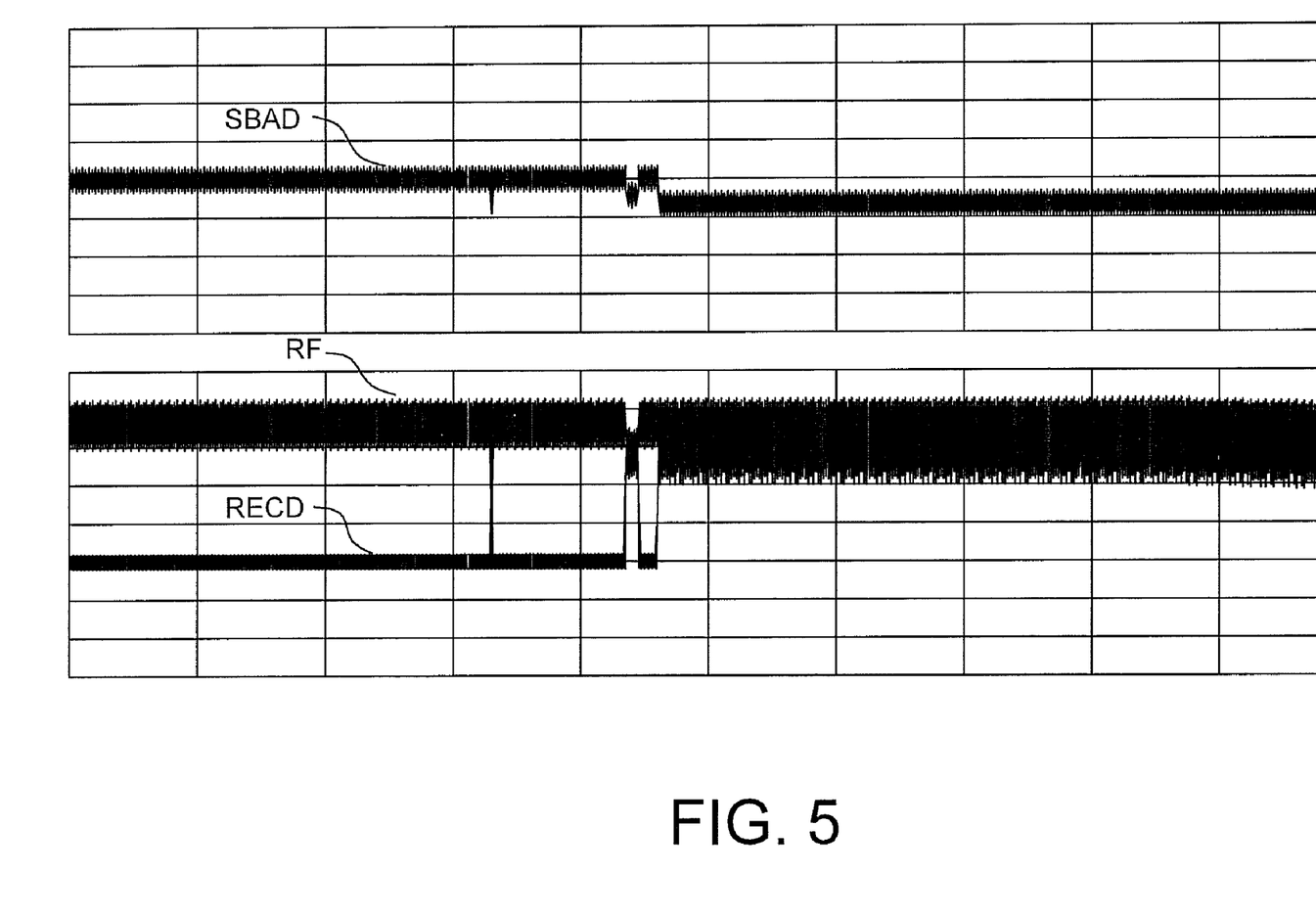
FIG. 5 shows waveforms of various servo signals obtained when the step S206 is performed and the optical disk is an un-finalized DVD-R.
Figure 6:
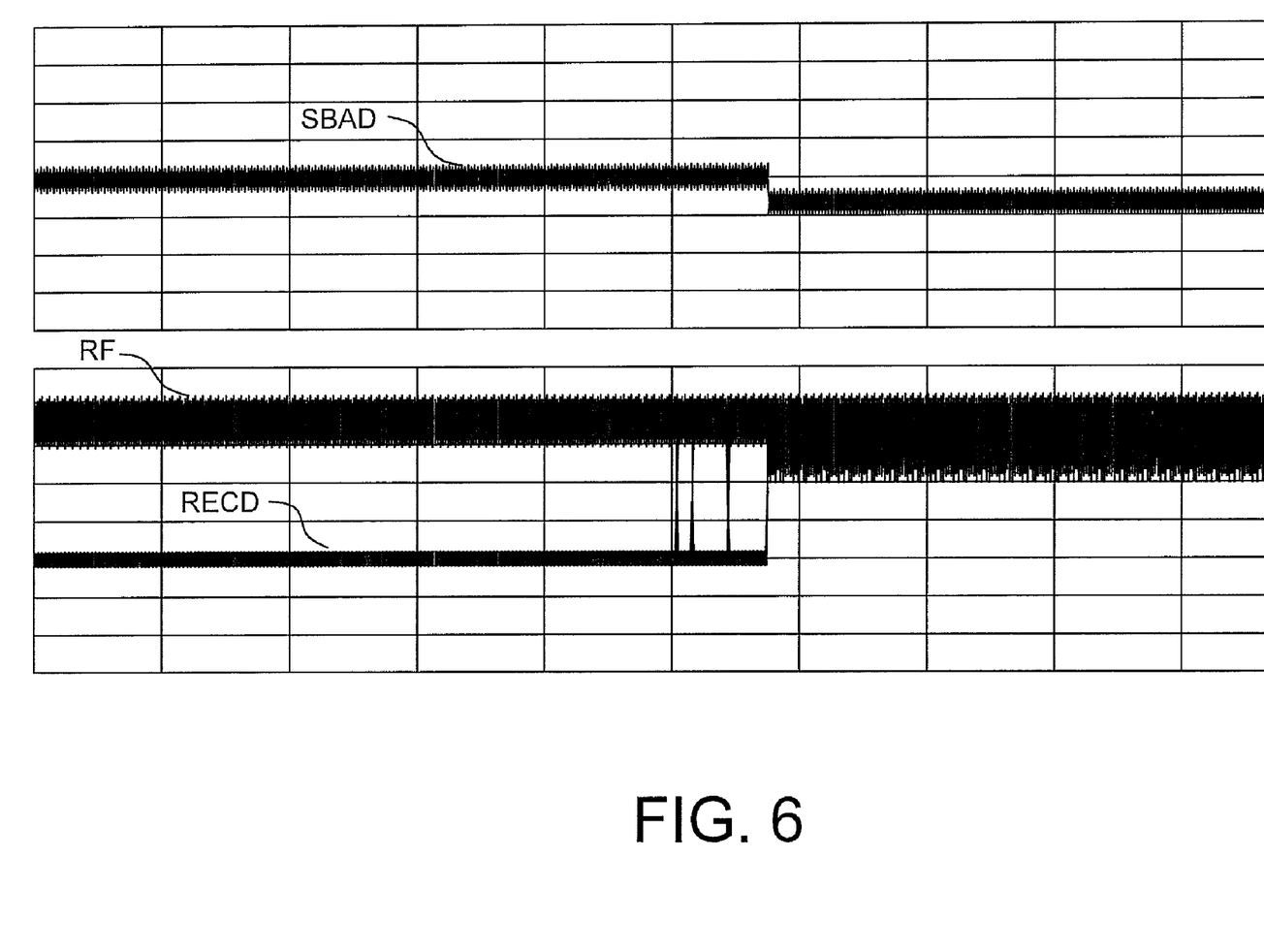
FIG. 6 shows waveforms of various servo signals obtained when the step S206 is performed and the optical disk is an un-finalized DVD+R.
Figure 7:
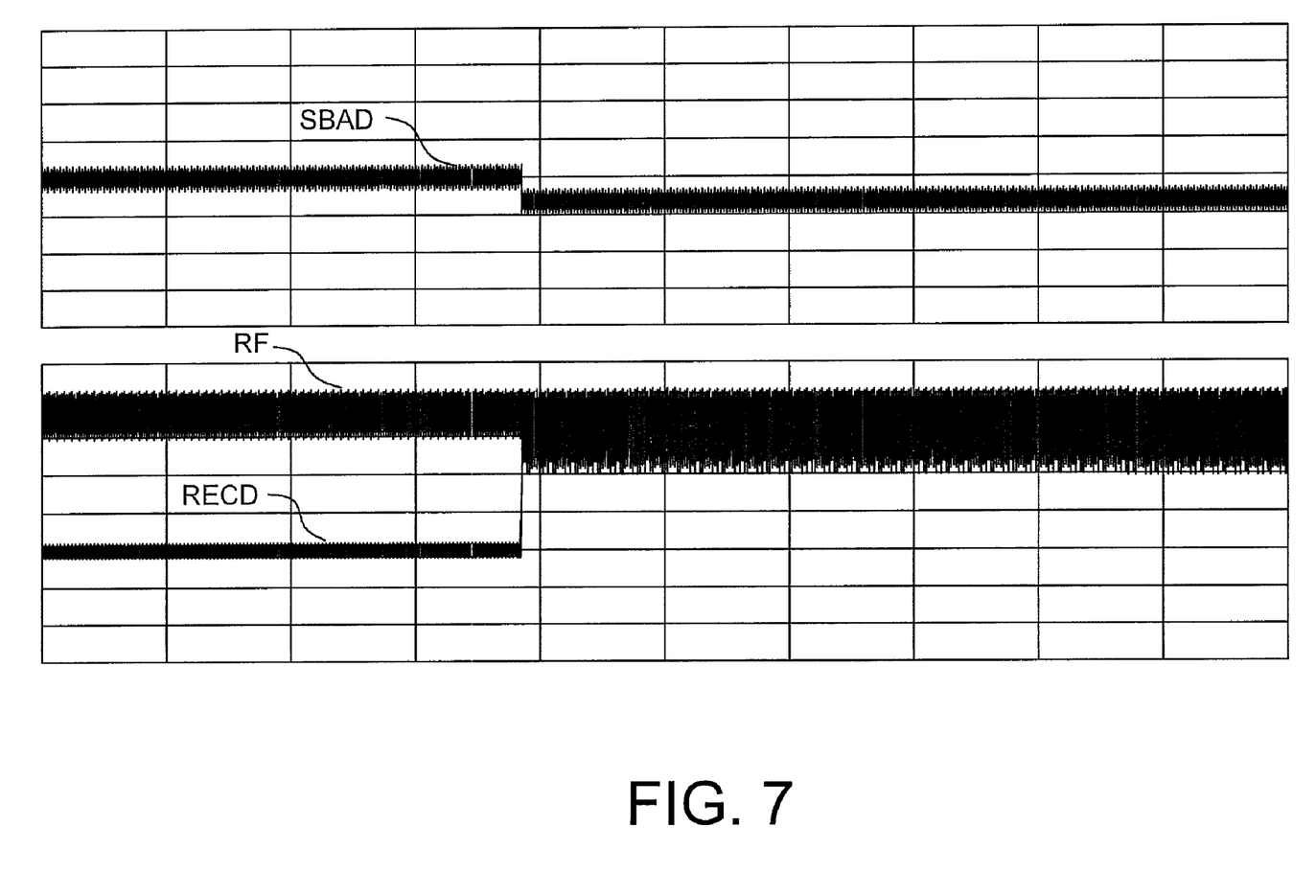
FIG. 7 shows waveforms of various servo signals obtained when the step S206 is performed and the optical disk is a finalized DVD-R.
Figure 8:
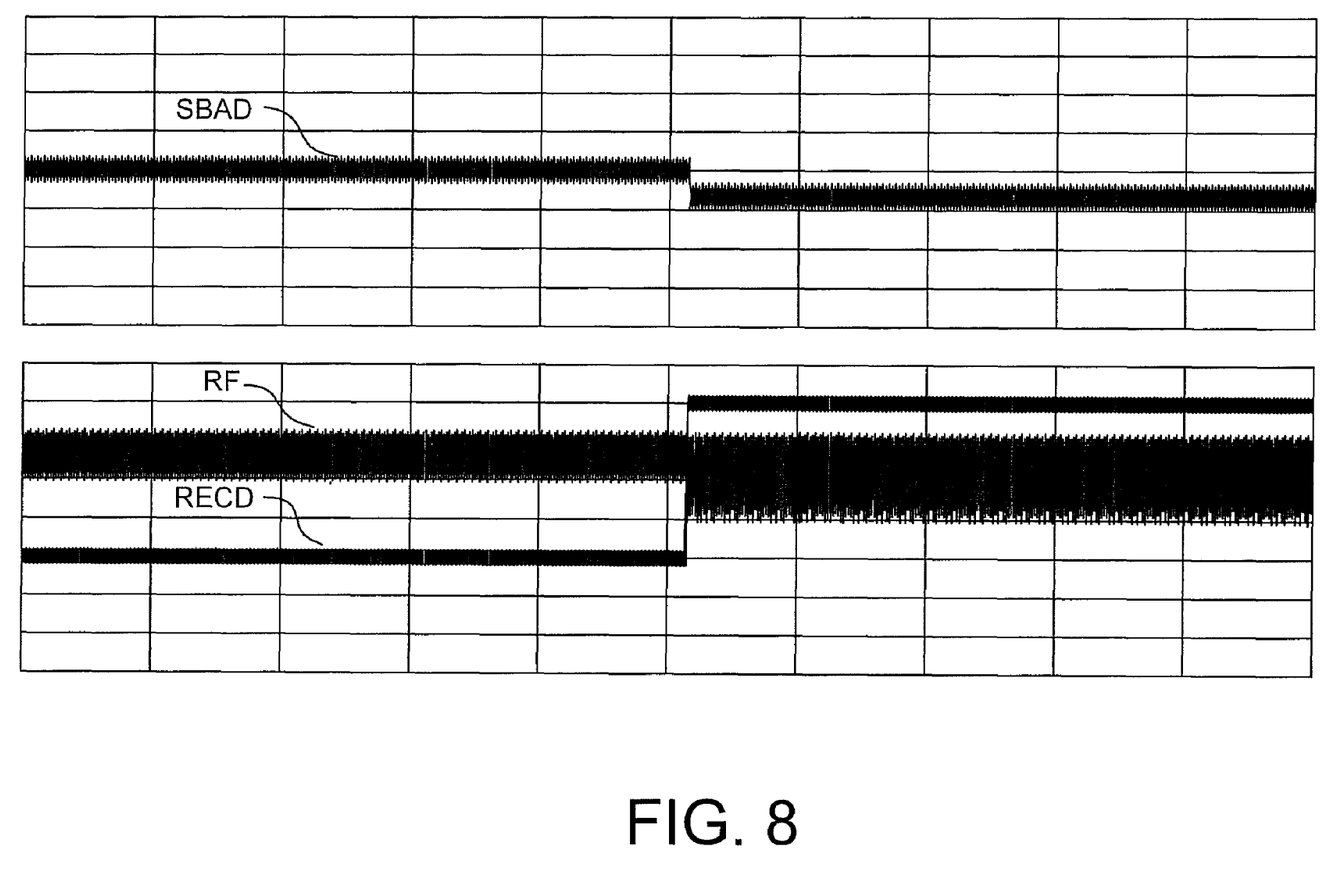
FIG. 8 shows waveforms of various servo signals obtained when the step S206 is performed and the optical disk is a finalized DVD+R.
Figure 9:
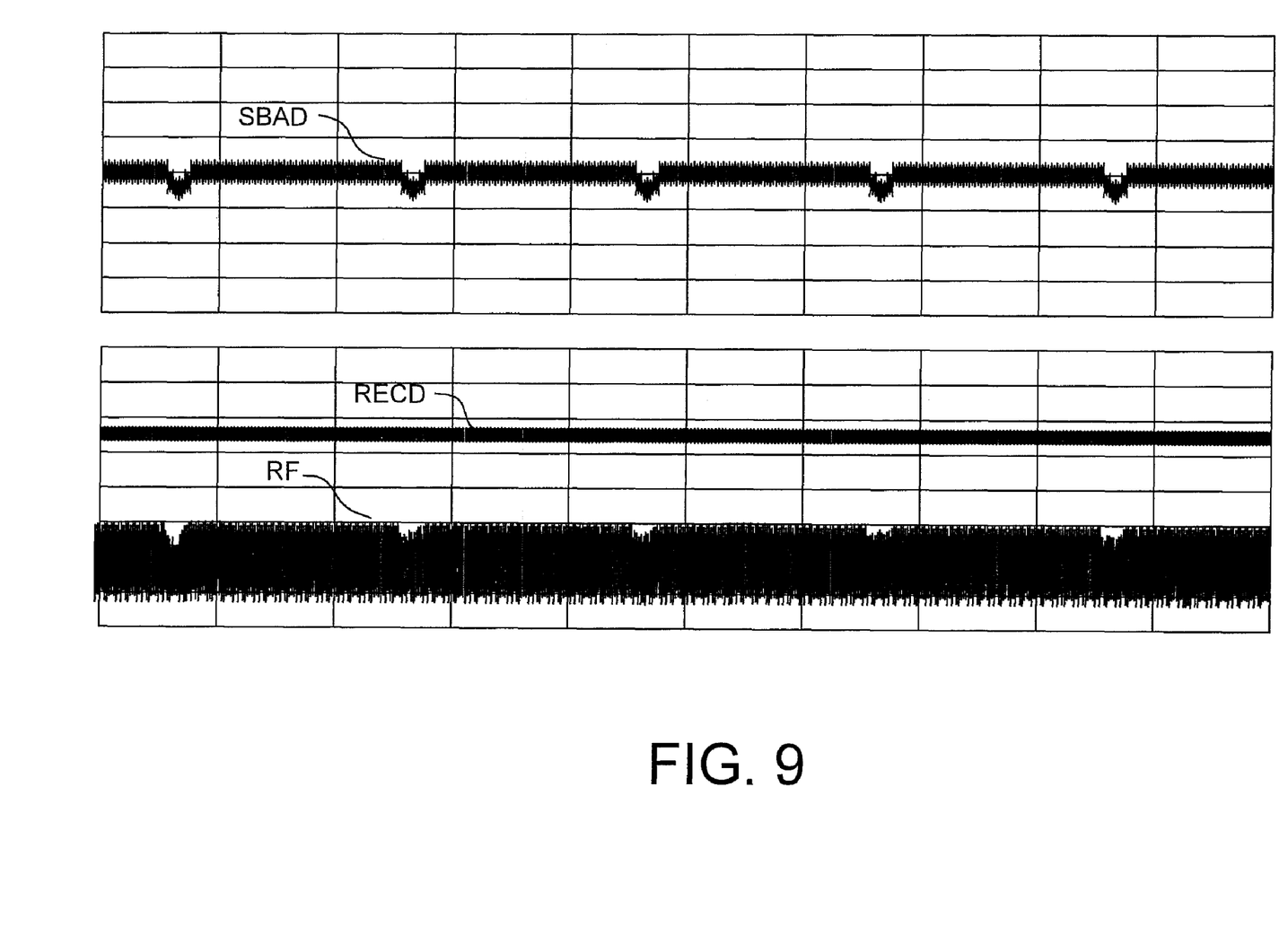
FIG. 9 shows waveforms of various servo signals obtained when the step S206 is performed and the optical disk is a DVD-ROM.

FIG. 3 shows waveforms of various servo signals obtained when the step S206 is performed and the optical disk is an empty DVD-R. FIG. 4 shows waveforms of various servo signals obtained when the step S206 is performed and the optical disk is an empty DVD+R. FIG. 5 shows waveforms of various servo signals obtained when the step S206 is performed and the optical disk is an un-finalized DVD-R. FIG. 6 shows waveforms of various servo signals obtained when the step S206 is performed and the optical disk is an un-finalized DVD+R. FIG. 7 shows waveforms of various servo signals obtained when the step S206 is performed and the optical disk is a finalized DVD-R. FIG. 8 shows waveforms of various servo signals obtained when the step S206 is performed and the optical disk is a finalized DVD+R. FIG. 9 shows waveforms of various servo signals obtained when the step S206 is performed and the optical disk is a DVD-ROM. In the following steps, the embodiment of the invention will be described according to the above-mentioned waveform charts.

In step S207, the count of enabled times of the recorded detection signal, the corresponding enabled time period and the time of moving the optical pickup are calculated.

In step S208, the count of enabled times of the recorded detection signal is counted.

In step S209, when the count of enabled times of the recorded detection signal is 0, the optical disk is identified as the empty DVD+R. As shown in FIGS. 1 and 4, the DVD+R is different from the DVD-R because no prewrite operation is performed when the DVD+R is shipped out. Thus, when the optical pickup is moved past the prewrite zone, the recorded detection signal is kept at a low voltage, the recorded sub beam add signal is kept at a high voltage, and the signal wobble of the radio frequency signal is also kept unchanged. Because the recorded detection signal is completely disabled only in the empty DVD+R, it represents that the optical disk in the optical drive is the DVD+R as long as the count of enabled times of the recorded detection signal is equal to 0.

In step S210, when the count of enabled times of the recorded detection signal is 1, a ratio of its corresponding enabled time period to the time of moving the optical pickup is calculated.

As shown in FIGS. 1 and 3, a prewrite operation is performed in the lead-in zone when the DVD-R is shipped out, so the recorded detection (RECD) signal is changed from low to high when the optical pickup sweeps across the prewrite zone. Similarly, the recorded sub beam add (SBAD) signal is changed from high to low, and the signal wobble of the radio frequency (RF) signal is also enlarged therewith.

Next, as shown in FIGS. 1, 7 and 8, test write tracks are formed in the optimal power calibration zone of the finalized DVD+R or DVD-R, and continuously written tracks are formed in the lead-in zone and the data zone. Therefore, when the optical pickup sweeps across these zones, the recorded detection signal is changed from low to high once, the recorded sub beam add signal is changed from high to low once, and the signal wobble of the radio frequency signal is changed from the smaller wobble to the larger wobble.

Finally, as shown in FIGS. 1 and 9, the DVD+ROM should be recorded with data in the OPC zone, the lead-in zone and the data zone. Therefore, when the optical pickup sweeps across these zones, the recorded detection signal is continuously kept high, the recorded sub beam add signal is continuously kept low, and the signal wobble of the radio frequency signal becomes relatively larger.

As can be understood from the above-mentioned waveform charts, there are three conditions in which the count of enabled times of the recorded detection signal is equal to one. The first condition corresponds to the empty DVD-R, the second condition corresponds to the finalized DVD (+R or -R), and the third condition corresponds to the DVD-ROM. The three types of disks have different enabled time periods corresponding to the recorded detection signals. In addition, the moving speed of the optical pickup also influences the enabled time period of the recorded detection signal. Please refer to FIGS. 3, 7, 8 and 9. When the optical disk is the empty DVD-R, the recorded detection signal is kept high only for a short period. When the optical disk is the finalized DVD (+R or -R), the recorded detection signal is changed from low to high and then kept high. When the optical disk is the DVD-ROM, the recorded detection signal is kept high at the beginning. Therefore, the following identifying procedures are performed in three paths.

In step S211, when the ratio is smaller than a predetermined value, the optical disk is identified as the empty DVD-R disk. As shown in FIG. 3, the empty DVD-R only has a few recorded tracks in the lead-in zone, so it represents that the optical disk is the empty DVD-R as long as the recorded detection signal is temporarily enabled.

In step S212, when the ratio is greater than the predetermined value and smaller than 1, the optical disk is identified as the finalized DVD-R disk or the finalized DVD+R disk. As shown in FIGS. 7 and 8, the finalized DVD is recorded with data except for a portion of the optimal power calibration zone being kept empty. Therefore, it represents that the optical disk is the finalized DVD±R disk as long as the recorded detection signal is enabled (high) and kept in the enabled state after the optical pickup is moved.

In step S213, when the ratio is equal to 1, the optical disk is identified as the DVD-ROM disk. As shown in FIG. 9, the DVD-ROM is recorded with data from the address 0x00000 to the address 0x40000, so the recorded detection signal is continuously kept high. Thus, when the ratio of the count of enabled times to the enabled time period is equal to 1, it represents that the optical disk in the optical drive is the DVD-ROM.

In step S214, when the count of enabled times of the recorded detection signal is equal to 2, the optical disk is identified as the un-finalized DVD+R disk. As shown in FIGS. 1 and 6, the recorded but un-finalized DVD+R has recorded tracks in the optimal power calibration zone and the data zone, but has no recorded track in the lead-in zone. Therefore, when the optical pickup sweeps across these zones, the recorded detection signal is changed from low to high twice, the recorded sub beam add signal is changed from high to low twice, and the signal wobble of the radio frequency signal is also enlarged twice. Thus, as long as the detected number of enabled times of the recorded detection signal is equal to 2, it represents that the optical disk in the optical drive is the un-finalized DVD+R.

In step S215, when the count of enabled times of the recorded detection signal is equal to 3, the optical disk is identified as the un-finalized DVD-R disk. As shown in FIGS. 1 and 5, the recorded but un-finalized DVD-R has the recorded tracks in the optimal power calibration zone and the data zone. So, when the optical pickup sweeps across these zones, the recorded detection signal is changed from low to high thrice, the recorded sub beam add signal is changed from high to low thrice, and the signal wobble of the radio frequency signal is enlarged thrice. Therefore, as long as the detected number of enabled times of the recorded detection signal is equal to 3, it represents that the optical disk in the optical drive is the DVD-R.

According to the waveform charts in conjunction with the property of the physical data distribution of the disk, one method for identifying the type of the disk can be concluded. In this method, the type of the disk can be identified as long as the relationships between the count of enabled times of one of the servo signals is enabled (or works), the enabled time period (or working time period) and the time of moving the optical pickup are obtained.

Although one possible aspect of the method for identifying the type of the optical disk has been described in the above-mentioned embodiment, it is to be noted that one of ordinary skill in the art may easily understand that the specific servo signal is not restricted to the recorded detection signal used in this embodiment. For example, the recorded detection signal may be replaced with the recorded sub beam add signal, wherein the difference therebetween is that the recorded sub beam add signal is low when being enabled (or when it works). In addition, the radio frequency signal or the radio frequency ripple signal may be adopted, wherein the difference therebetween is that the amplitude is enlarged when the radio frequency signal and the radio frequency ripple signal are enabled (or work). In addition, the focus error (FE) signal and the tracking error (TE) signal may be applied to the method for identifying the disk according to different designs, so the application of the invention is not particularly restricted. In other words, any method for identifying the type of the optical disk according to the count of enabled times of any one of the servo signals and its corresponding enabled time period satisfies the spirit of the invention.

In addition, the count of enabled times is first identified and then the type of the optical disk is identified according to the enabled time period. However, one of ordinary skill in the art may easily understand that the effects according to the embodiment of the invention still can be achieved by saving the enabled time period of the servo signal first and then identifying the type of the optical disk according to the count of enabled times. So, the invention should not be restricted to the order of the steps in the above-mentioned embodiment. Furthermore, although only the method for identifying the type of DVD is described, one of ordinary skill in the art may understand that this technology can be applied to any disk, such as a Blu-ray disk (BD), a high definition DVD (HD-DVD) or the like, having different positions of physical recorded zones. Thus, the invention is not restricted thereto.

In summary, the spirit of the invention is to identify the type of the optical disk according to different properties of the positions of the physical recorded zones of the disks. The invention can quickly and correctly identify the type and the state of the disk according to the distribution difference between the potentials of the servo signals generated according to different recorded positions in the data zone on the disk. The embodiment of the invention has the following advantages.

First, the type of the disk can be obtained without waiting for the turn-on of the optical drive to read the data on the disk.

Second, the condition of incorrectly identifying the type of the disk due to the quality difference between the manufactured disks can be avoided.

Third, the difficult condition of identifying the type of the disk according to the wobble signal due to the damaged wobble signal after the disk is recorded with data can be avoided.

The above-mentioned factors may be solved at a time according to the method of the invention.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A method for identifying a type of an optical disk, comprising the steps of:
   turning on a laser diode to focus light emitted from the laser diode on the optical disk;
   moving an optical pickup to obtain a plurality of servo signals;
   reading a specific servo signal from the servo signals; and
   determining the type of the optical disk according to the count of enabled times of the specific servo signal and a corresponding enabled time period.

2. The method according to claim 1, wherein the step of moving the optical pickup comprises:
   moving the optical pickup from inner ring to outer ring or from outer ring to inner ring.

3. The method according to claim 1, wherein the step of reading the specific servo signal comprises:
   saving the count of enabled times of the specific servo signal and the enabled time period; and
   saving a ratio of the enabled time period to a total time period of moving the optical pickup.

4. The method according to claim 1, wherein the step of determining the type of the optical disk comprises:
   identifying the optical disk as an empty DVD+R disk when the count of enabled times of the specific servo signal is 0.

5. The method according to claim 1, wherein the step of determining the type of the optical disk comprises:
   identifying the optical disk as an un-finalized DVD+R disk when the count of enabled times of the specific servo signal is 2.

6. The method according to claim 1, wherein the step of determining the type of the optical disk comprises:
   identifying the disk as an un-finalized DVD-R disk when the number of enabled times of the specific servo signal is 3.

7. The method according to claim 1, wherein the step of determining the type of the optical disk comprises:
   calculating a ratio of a total time period of moving the optical pickup to an enabled time period of the specific servo signal when the count of enabled times of the specific servo signal is 1;
   identifying the optical disk as an empty DVD-R disk when the ratio is smaller than a predetermined value;

identifying the optical disk as a finalized DVD-R disk or a finalized DVD+R disk when the ratio is greater than the predetermined value and smaller than 1; and identifying the optical disk as a DVD-ROM disk when the ratio is equal to 1.

8. The method according to claim 1, wherein the specific servo signal is a recorded detection (RECD) signal.

9. The method according to claim 1, wherein the specific servo signal is a focus error (FE) signal.

10. The method according to claim 1, wherein the specific servo signal is a tracking error (TE) signal.

11. The method according to claim 1, wherein the specific servo signal is a radio frequency (RF) signal.

12. The method according to claim 1, wherein the specific servo signal is a radio frequency ripple (RFRP) signal.

13. The method according to claim 1, wherein the specific servo signal is a recorded sub beam add (SBAD) signal.

14. The method according to claim 1, further comprising:
identifying the optical disk as CD, DVD5 or DVD9 according to a level of a signal obtained after focusing laser beams with different wavelengths.

15. The method according to claim 1, further comprising the step of:
identifying the optical disk as a DVD ROM disk or a DVD RW disk according to a peak-to-peak value of a focus error signal.

* * * * *